Feb. 1, 1966 JOSEPH F. KRUJ 3,233,119
NOW BY CHANGE OF NAME JOSEPH F. KRUY
PULSE SENSING CIRCUIT FOR BIPOLARITY SIGNALS
UTILIZING A TUNNEL DIODE

Filed Jan. 2, 1962 2 Sheets-Sheet 1

INVENTOR.
JOSEPH F. KRUJ

BY Henry L. Hanson

ATTORNEY

INVENTOR.
JOSEPH F. KRUJ
BY Henry L. Hanson
ATTORNEY

United States Patent Office 3,233,119

Patented Feb. 1, 1966

3,233,119

PULSE SENSING CIRCUIT FOR BIPOLARITY SIGNALS UTILIZING A TUNNEL DIODE

Joseph F. Kruj, now by change of name Joseph F. Kruy, West Newton, Mass., assignor to Honeywell Inc., a corporation of Delaware

Filed Jan. 2, 1962, Ser. No. 163,673
8 Claims. (Cl. 307—88.5)

A general object of the present invention is to provide a new and improved apparatus useful in the manipulation and handling of electrical pulse signals. More specifically, the present invention is concerned with a new and improved pulse handling circuit which is particularly useful in handling bipolar pulses and which is characterized by the unique use of a tunnel diode, of the type exhibiting bistable characteristics, to a sensing circuit that is capable of operating at very high speeds while retaining circuit simplicity.

In digital data processing systems, there are frequently employed various types of data storage elements for storing digital data which is to be used in connection with problems being carried out by way of the data processing system. One well-recognized form of data storage element is a magnetic core of the type having a rectangular hysteresis characteristic. Such magnetic cores are utilized in various ways for data storage purposes including memories such as coincident current memories. When core devices are used in coincident current memories they are generally arrayed in some type of matrix with suitable addressing schemes for selecting predetermined cores, and thereby the data stored therein, from the memory. The output signals from a memory using these cores generally take the form of bipolar pulses which are generated in a sense winding threading the matrix with each pulse being related to a particular core or cores which are switched at a selected time wtihin the memory. The addressing and loading of information with respect to the memory frequently induces signals in the associated sense wiring running through the memory in such a way that these signals may well exceed in magnitude the signals which it may be desired to sense. Consequently, it is necesary to provide a bipolar signal sensing circuit which is capable of being stored, or rendered active, at a preselected instant in order to determine whether or not the desired signal is present on the sense winding at a predetermined time. The present invention concerns itself primarily with the latter type of sensing circuit. This sensing circuit, particularly with high-speed core memories providing the input pulses, must of necessity have a very fast responsive time as well as recovery time and yet provide a useful and regulated output signal which accurately indicates the presence or absence of certain input information signals applied to the circuit.

Inasmuch as the tunnel diode exhibits bistable characteristics and switching times that are extremely fast, it has been found to be possible to uniquely associate a tunnel diode in a pulse-sensing circuit so that the circuit will be capable of selectively sensing input pulses and producing uniform output pulses.

It is therefore a more specific object of the present invention to provide a new and improved pulse sensing circuit incorporating the high-speed switching and bistable characteristics of the tunnel diode.

In arranging the circuitry associated with the tunnel diode for optimum operating characteristics, it is desirable that means be provided for eliminating unwanted input signals without detracting from the response characteristics of the apparatus under conditions of normal operation. For this purpose, the present invention incorporates a unique circuit on the input of a tunnel diode switching element which circuit serves to block out unwanted input signals and which circuit, by itself, is incapable of controlling the switching in the associated tunnel diode in the absence of an associated strobing signal.

It is therefore a still further object of the present invention to provide a new and improved pulse signal sensing circuit utilizing a tunnel diode wherein the input circuitry to the tunnel diode includes a signal suppression circuit which circuit will not affect the operation of the tunnel diode in the absence of an associated strobing or control pulse.

Inasmuch as the tunnel diode exhibits bistable characteristics, it is necessary that provision be made for switching the tunnel diode from one bistable state to the other once it has been switched to the one bistable state upon the occurrence of a coincidence between a strobing signal and an input pulse. The manner in which this resetting operation takes place may be implemented in several different ways, as taught herein, such as by way of separate reset signals coupled into the tunnel diode control circuitry or by way of uniquely arranging the strobing signal so that the leading edge thereof will be used for activating the circuit, for purposes of sensing an input pulse, and the trailing edge thereof is used for resetting the tunnel diode if it was set during the sensing period.

Another object of the invention is then to provide a new and improved tunnel diode-type pulse sensing circuit which utilizes the unique characteristics of the tunnel diode wherein it has two positive resistance regions separated by a negative resistance region and incorporates unique circuitry for resetting the tunnel diode to condition the tunnel diode to sense a further input pulse.

Still another object of the invention is to provide a new and improved tunnel diode pulse sensing circuit wherein the tunnel diode is utilized in its bistable mode and wherein a strobing signal is provided for activating the circuit for sensing a pulse and the strobing signal is also used for purposes of resetting the circuit in the event that a signal was sensed during the time that the strobe signal was activating the circuit.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
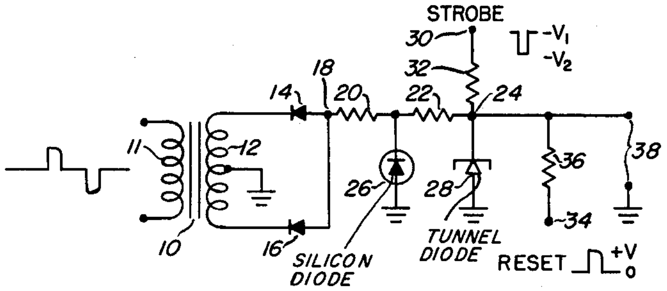
FIGURE 1 illustrates schematically one form of pulse-sensing circuit which incorporates the principles of the present invention.

Referring first to FIGURE 1, there is here illustrated the basic form of the invention wherein a tunnel diode is utilized in its bistable mode of operation in a pulse-sensing circuit in combination with a signal suppresser for keeping out unwanted signals, a strobe signal input for activating the circuit, and a reset signal input for reconditioning the circuit for a further sensing operation.

Considering FIGURE 1 more specifically, the numeral 10 identifies an input transformer having a primary winding 11 and a secondary winding 12. A pair of diodes 14 and 16 are connected to the end terminals of the secondary winding 12 and these two diodes are in turn connected together on their anode ends to a common junction point 18. A pair of resistors 20 and 22 are connected in series between the junction point 18 and a further junction point 24. A diode 26 is shown connecting the junction between the resistors 20 and 22 to ground. The sensing element of the combination is the tunnel diode 28 which is shown to be connected between the junction point 24 and ground. A strobing signal input terminal 30 is connected to the junction 24 by way of a resistor 32. A reset signal terminal 34 is shown connected to the junction point 24 by way of a further resistor 36. A pair of output terminals 38 are shown connected to ground and to the common junction point 24.

Figure 2A:
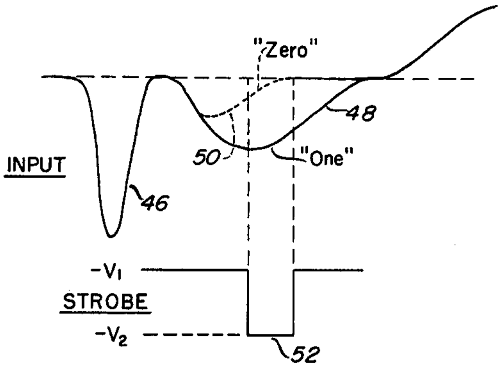
FIGURE 2A illustrates representative pulse signals which may be associated with the circuitry of FIGURE 1.
Figure 2B:
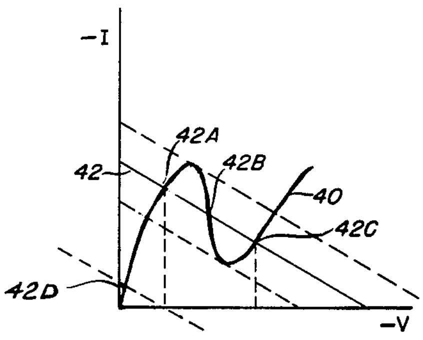
FIGURE 2B shows the voltage-current characteristic of the tunnel diode of FIGURE 1.

Before considering the over-all operation of FIGURE 1, reference should be made to FIGURE 2B for an analysis of the operation of the tunnel diode 28. Plotted in FIGURE 2B is the general characteristic curve associated with a typical tunnel diode as such curve is related to the current and voltage characteristics of the diode. This characteristic is illustrated by the curve 40. A load line 42 is shown intersecting the curve 40 at 42A, 42B and 42C. The circuit of the tunnel diode is such that with a load line intersecting the characteristic curve as indicated, the diode will have a stable operating condition at point 42A and 42C. The circuit will be unstable at 42B because of the negative slope of the curve 40 as it passes over the load line 42. In order to shift the tunnel diode from one stable state to the other as represented at 42A and 42C, it is necessary to effect a change in the current flow through the diode so that either the maximum current point or the minimum current point on the characteristic curve 40 is exceeded at which time the diode will automatically switch to the other stable state and stay there until such time as the effective input signal is reversed.

FIGURE 2A illustrates typical waveforms associated with the input and strobing signals applied to the circuitry of FIGURE 1. In this figure, the numeral 46 identifies what may be termed a noise signal or inhibit signal associated with the input which may well take the form of a coincident current memory sense winding. The portion of the curve identified by the numeral 48 may be considered as a signal representing a "one" while that curve, as indicated at 50, may be considered as that level of signal present when a "zero" is received from the input. The strobe signal 52 will be seen to be a square wave whose time duration is arranged to bracket a portion of either the "one" signal or the "zero" signal of the input pulse.

Considering next the over-all operation of FIGURE 1, it is assumed that a bipolar signal is arranged to be applied to the input primary winding of the transformer 10. This bipolar signal will be rectified and will appear at the common junction point 18. In the event that the input signal at point 18 takes the form indicated at FIGURE 2A, it will be apparent that it is desired that the circuit reject the noise or inhibit signal 46 and be conditioned to accept a "one" signal in the event that a "one" has occurred at the time that the circuit is conditioned by way of the strobe signal 52. When the signal 46 is present at the junction point 18, this signal will be applied to the diode 26. The diode 26 may well be a silicon diode having a conducting threshold of approximately one-half volt in which event the diode 26 will become conductive and effect the short circuiting or bypassing of the signal 46 to ground. Under these conditions, the tunnel diode 28 is assumed to be operating in its low voltage condition such as indicated at 42D in FIGURE 2B. The appearance of the noise signal 46 on the input will be insufficient to cause any appreciable change in current flow in the tunnel diode 28 sufficient to cause any switching of the diode from its stable state.

In the event that the signal 48 appears at the junction point 18, this signal will, in effect, have the same action upon the diode 26 to cause the diode 26 to be conductive. A certain amount of current will flow through the resistor 22. At the instant that the strobe signal appears, the combined current flowing through the resistor 22 and resistor 32 will be sufficient to cause the tunnel diode 28 to switch away from its low voltage state at 42D and into the stable state at 42C. This will means that there will be a voltage drop on the output terminals 38. This voltage drop on the terminals 38 will remain until such time as the tunnel diode 28 is once again switched back to its opposite bistable state. This will occur upon the application of the reset pulse to the terminal 34. The reset pulse has the effect of decreasing the current flowing in the tunnel diode 28 so that it will once again switch back to the bistable state 42D.

It will be seen that the reset terminal 34 and its associated signal may be eliminated if the strobe signal at 30 is switched back to a positive voltage following the strobe operation.

Figure 3:
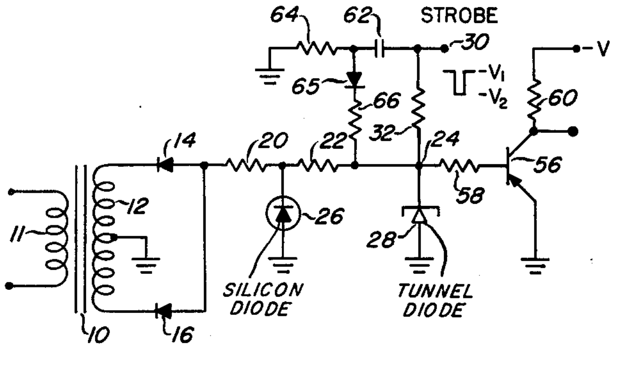
FIGURE 3 illustrates a modified form of the invention wherein the strobe signal is used for activating and resetting the circuit.

Referring next to FIGURE 3, it will be noted that the circuit here is basically the same as that of FIGURE 1 except for differences in the output circuitry and in the strobe and reset circuitry. In order to facilitate a consideration of FIGURE 3, components corresponding to those of FIGURE 1 carry corresponding reference numerals.

The output circuitry associated with FIGURE 3 takes the form of a transistor 56 having the usual base, emitter and collector electrodes. The base of the transistor 56 is connected to the common junction point 24 by way of a resistor 58. A load resistor 60 is connected in the emitter-collector circuit of the transistor 56.

The strobe signal terminal 30, in addition to being connected to the coupling resistor 32 is also coupled to a differentiating circuit. This differentiating circuit comprises a condenser 62, a resistor 64, and an output coupling circuit comprising a diode 65 and a coupling resistor 66.

In operation, the pulse sensing function accomplished by the circuit of FIGURE 3 will be same as that of FIGURE 1. Thus, when an input "one" signal, such as signal 48 of FIGURE 2A, is received, and the strobe signal appears at the terminal 30, the tunnel diode 28 will switch from its low voltage state to its high voltage state. This switching will cause a base current to flow in the resistor 58 and the transistor 56 will be switched into a conductive state.

The circuit will remain in that state until such time as the tunnel diode 28 is switched back to its opposite bistable state. This switching operation is accomplished in this particular form of the invention by way of the trailing edge of the strobe pulse. This trailing edge of the strobe pulse will be differentiated by the differentiating circuit 62–64 and the resultant differentiated pulse will be of such a polarity that it may be coupled through the diode 65 and resistor 66 to the junction 24 to thereby decrease the current flow relative to the tunnel diode 28. This will switch the tunnel diode 28 back into its low conduction state where it will remain until such time as the proper combination of input signals once again occurs to indicate that a "one" signal has been received.

It will be apparent in this particular form of the invention that the need for an external and separate reset source has been eliminated with the resetting and strobing being accomplished by way of the same signal source and the same input pulse.

Figure 4:
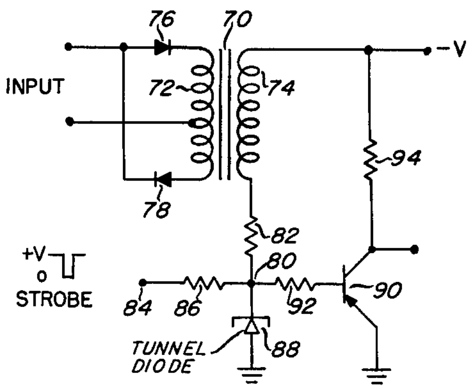
FIGURE 4 illustrates a further modified form of the invention utilizing a common strobe and reset signal source.
Figure 5:
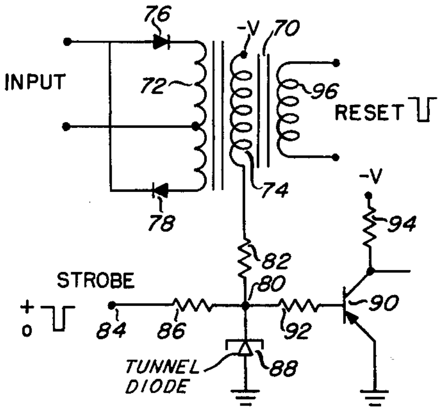
FIGURE 5 illustrates a still further modified version of the invention.

The circuitry illustrated in FIGURE 4 as well as in FIGURE 5 operates upon the same basic principles as set forth above in connection with FIGURES 1 and 3. In this case, however, the tunnel diode is operated in the voltage switching mode rather than in the current switching mode. Here, the input is by way of a transformer 70 having a tapped primary winding 72 and a secondary winding 74. The input terminals are shown connected to the ends by way of the diodes 76 and 78 and to the center tap of the primary 72. Thus diodes 76 and 78 may well be backward diodes or uni-tunnel diodes to insure low forward voltage drop and thereby a larger current flow in the associated portion of primary winding 72. The effect of this particular connection is to provide a unipolar output pulse in the winding 74 with a bipolar input pulse appearing on the input terminals. The secondary 74 is coupled to a common junction point 80 by way of a coupling resistor 82. A strobe pulse terminal 84 is coupled to the common junction terminal 80 by way of a coupling resistor 86. A tunnel diode 88 is shown connected between the common terminal 80 and ground. The output of the circuit takes the form of a transistor 90 having the usual base, emitter and collector electrodes. The base of the transistor 90 is connected to the common junction 80 by way of a resistor 92. A load resistor 94 is coupled in the emitter-collector circuit of the transistor 90.

Under conditions of normal operation in FIGURE 4, in the absence of an input pulse, the tunnel diode 88 will be switched to its low conductive level bistable state. This low level of conduction will be maintained at that level by reason of the fact that the voltage normally occurring on the strobe signal terminal 84 will be positive.

If an input signal appears on the input terminals and the resultant unipolar pulse on the winding 74 is coupled to the common terminal 80, the tunnel diode 88 will try to conduct an additional amount and will be permitted to do so as soon as the strobe pulse appears and thereby eliminates the positive voltage appearing on the terminal 84. This will allow the tunnel diode 88 to switch to its high conducting state to thereby drop the voltage at the point 80 and cause the transistor 90 to be switched into the conducting state. As soon as the strobe pulse has been removed, the current available for the diode 88 will drop below the level necessary to maintain the high-level bistable state and consequently the current will then switch back to the low-level bistable state. At this point, the transistor 90 will be switched to be non-conducting.

It will be apparent that the ability of the circuit to switch back to the low-level bistable state on the tunnel diode 88 will be directly related to the relative magnitudes or sizes of the resistors 82 and 86 as well as the relative magnitudes of the voltages applied to the inputs thereof. In the event that it is desired that the removal of the strobe pulse not cause a switching back to the low-level conducting state at the diode 88, the relative value of the resistor 86 with respect to resistor 82 must be changed so that the resultant effect of the positive signal once again appearing at the terminal 84 will be insufficient to cause the current to change in the diode 88 so that it cannot switch to the second bistable state.

The circuitry of FIGURE 5 illustrates a form of circuit wherein the strobe and reset functions of FIGURE 4 have been separated. For purposes of explanation, components corresponding to those of FIGURE 4 carry corresponding reference characters. The only element added to FIGURE 5 is an additional winding 96 on the transformer 70. The operation of the circuit of FIGURE 5 will be the same as that of FIGURE 4 insofar as the sensing of an input pulse and the activating of the circuit by way of a strobe pulse is concerned. In this case, however, it is assumed that the relative magnitudes of the resistors 82 and 86 and the respective voltage sources is such that the removal of the strobe pulse on the terminal 84, and the resultant application of the quiescent voltage to the junction 80 will be insufficient to cause the current flow through the tunnel diode 88 to switch back to its low-level bistable state. In order to effect this switching, the reset pulse is applied to the primary winding 96 which will induce in the winding 74 a signal which will tend to overcome the negative voltage in the circuit and thereby the current flowing to the tunnel diode 88 will decrease to a point where it can then switch to its low-level bistable state.

It will be apparent from the foregoing description that their has been illustrated and described a new and novel pulse-sensing circuit utilizing the bistable current characteristics of a tunnel diode and that these characteristics have been uniquely combined in a circuit which will provide a uniform output pulse and provide convenient means for selectively activating the circuit for sensing purposes as well as convenient means for resetting the circuit following a sensing operation.

It will also be apparent that the unique characteristics of the tunnel diode may be incorporated in a circuit so that the over-all effect is that of a monostable circuit which is self-resetting. This may be achieved by way of shifting the steady-state load line in FIGURE 2 to a point where it intercepts only one of the positive resistance regions of the diode with delay means to hold it in the opposite state for a predetermined period once it is switched.

While, in accordance with the provisions of the statutes, there have been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure Letters Patent is:

1. In combination, an input transformer having a primary winding adapted to be connected to a bipolar signal source and a secondary winding, rectifier means, a tunnel diode having one terminal connected to a selected voltage point and a second terminal, a first impedance circuit, means including said rectifier means and said first impedance circuit connecting said secondary winding to said second terminal, a strobe signal source connected to said second terminal, a reset signal source connected to said second terminal, and an output circuit connected to said second terminal.

2. In combination, an input transformer having a primary winding adapted to be connected to a bipolar signal source and a secondary winding, rectifier means, a tunnel diode having one terminal connected to a selected voltage point and a second terminal, a first impedance circuit comprising a pair of resistors having the junction thereof connected to a selected voltage point by way of a further diode having a predetermined threshold of conduction, means including said rectifier means and said first impedance circuit connecting said secondary winding to said second terminal, a strobe signal source connected to said second terminal, a reset signal source connected to said second terminal, and an output circuit connected to said second terminal.

3. In combination, an input transformer having a primary winding adapted to be connected to a bipolar signal source and a secondary winding, a tunnel diode having one terminal connected to a selected voltage point and a second terminal, a first impedance circuit, means including said first impedance circuit connecting said secondary winding to said second terminal, a combined strobe and reset signal source connected to said second terminal, and an output circuit connected to said second terminal.

4. The combination as set forth in claim 3 wherein said combined strobe and reset signal source comprises a square wave input source, first means connecting said source to said second terminal so that the leading edge of said square wave will be applied directly to said second terminal, and second means comprising a differentiating circuit connected between said square wave input source and said second terminal to differentiate the trailing edge of said square wave.

5. A bipolar signal sense circuit comprising a tunnel diode having a first terminal connected to a predetermined voltage point and a second terminal, a first input circuit connected to said second terminal comprising a transformer having a first primary winding and a secondary winding, the latter being connected through an impedance network to said second terminal, a second input circuit connected to said second terminal comprising a further primary input winding on said transformer and an output circuit connected to said second terminal.

6. Electrical apparatus for detecting bipolar input pulses comprising an input transformer having a primary winding and a secondary winding, a pair of diodes connecting two terminals on said secondary winding to a first common point, a pair of series-connected resistors having one end thereof connected to said first common point and the other end thereof connected to a second common point, a tunnel diode having two terminals, the first of which is connected to a predetermined voltage point and the second of which is connected to said second common point, a further resistor connecting a pulse signal source to said second common point, and an output circuit connected to said second common point.

7. Electrical apparatus for detecting bipolar input pulses comprising an input transformer having a primary winding and a secondary winding, a pair of diodes connecting two terminals on said primary winding to a first input terminal, a resistor having one end thereof connected to said secondary winding and the other end thereof connected to one terminal of a tunnel diode having two terminals, means connecting the second terminal of said tunnel diode to a common voltage point, a further resistor connecting a pulse signal source to said one terminal, and an output circuit connected to said one terminal.

8. Apparatus as defined in claim 7 wherein said pair of diodes are uni-tunnel diodes.

References Cited by the Examiner

UNITED STATES PATENTS

| | | | |
|---|---|---|---|
| 3,040,186 | 6/1962 | Van Duzer | 307—88.5 |
| 3,086,160 | 4/1963 | Loftus | 307—88.5 |
| 3,096,449 | 7/1963 | Stucki | 307—88.5 |
| 3,097,312 | 7/1963 | Miller | 307—88.5 |

OTHER REFERENCES

IBM Technical Disclosure Bulletin, by Akmenkalns, vol. 3, No. 8, January 1961, pages 38 and 39.

RCA Technical Notes No. 500, September 1961, Bistable Self-Resetting Tunnel Diode Amplifier, by Richard H. Bergman.

ARTHUR GAUSS, *Primary Examiner.*